United States Patent
Qi et al.

(10) Patent No.: US 11,638,166 B2
(45) Date of Patent: Apr. 25, 2023

(54) ROUTE DISCOVERY IN A TELECOMMUNICATION NETWORK

(71) Applicant: SAMSUNG ELECTRONICS CO., LTD., Suwon-si (KR)

(72) Inventors: Yinan Qi, Middlesex (GB); Saidhiraj Amuru, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/768,791

(22) PCT Filed: Nov. 30, 2018

(86) PCT No.: PCT/KR2018/015104
§ 371 (c)(1),
(2) Date: Jun. 1, 2020

(87) PCT Pub. No.: WO2019/108022
PCT Pub. Date: Jun. 6, 2019

(65) Prior Publication Data
US 2021/0176655 A1    Jun. 10, 2021

(30) Foreign Application Priority Data

Dec. 1, 2017  (IN) .............................. 201731043105
Nov. 28, 2018 (GB) ..................................... 1819385

(51) Int. Cl.
*H04W 24/10* (2009.01)
*H04W 40/24* (2009.01)

(52) U.S. Cl.
CPC .......... *H04W 24/10* (2013.01); *H04W 40/24* (2013.01)

(58) Field of Classification Search
None
See application file for complete search history.

(56) References Cited

U.S. PATENT DOCUMENTS

| 7,164,667 B2 * | 1/2007 | Rayment ................. H04L 45/02 370/230 |
| 2006/0083186 A1 * | 4/2006 | Handforth ........... H04W 88/085 370/310 |
| 2014/0003239 A1 | 1/2014 | Etemad et al. |

(Continued)

FOREIGN PATENT DOCUMENTS

| WO | 2014/000128 | 1/2014 |
| WO | 2014/008073 | 1/2014 |
| WO | 2016/065068 | 4/2016 |

OTHER PUBLICATIONS

Extended Search Report dated Sep. 14, 2020 in counterpart European Patent Application No. 18883671.2.

(Continued)

*Primary Examiner* — Brian S Roberts
(74) *Attorney, Agent, or Firm* — Nixon & Vanderhye P.C.

(57) ABSTRACT

Provided relates to route discovery in a telecommunication network. It particularly applies to route discovery in a network which uses Integrated Access and Backhaul (IAB). Disclosed is a method of route discovery in connection with establishing a backup backhaul network in an Integrated Access and Backhaul, IAB, network, the method comprising: discovering and maintaining backup backhaul links by providing channel measurement and reporting mechanisms.

17 Claims, 3 Drawing Sheets

(56) References Cited

U.S. PATENT DOCUMENTS

| | | | |
|---|---|---|---|
| 2017/0005913 A1* | 1/2017 | Hampel | H04L 45/245 |
| 2017/0006499 A1* | 1/2017 | Hampel | H04L 69/40 |
| 2017/0331670 A1 | 11/2017 | Parkvall et al. | |
| 2018/0041979 A1* | 2/2018 | Hampel | H04W 72/0446 |
| 2018/0091272 A1* | 3/2018 | Wang | H04B 7/0626 |
| 2018/0092139 A1* | 3/2018 | Novlan | H04B 7/2606 |
| 2018/0368142 A1* | 12/2018 | Liou | H04W 74/0808 |
| 2020/0389929 A1* | 12/2020 | Harada | H04W 76/15 |

OTHER PUBLICATIONS

Samsung: "Deployment scenarios for Integrated Access and Backhaul", R1-1711615, 3rd Generation Partnership Project (3GPP), 3GPP TSG RAN WG1 NR Ad-Hoc#2, Qingdao, China, Jun. 26, 2017, 4 pages.

Huawei et al: "Scenarios and requirements on Integrated Access and Backhaul", R1-1720605, 3rd Generation Partnership Project (3GPP), 3GPP TSG RAN WG1 Meeting #91, Reno, USA, Nov. 18, 2017, 6 pages.

Examination Report under Section 18(3) dated Mar. 26, 2020 in GB Patent Application No. 1819385.4.

AT&T; "NR Initial Access Procedure Design"; R1-1612361 3GPP TSG RAN1 Meeting #87 Nov. 13, 2016 (6 pages).

AT&T et al., "New SID Proposal: Study on Integrated Access and Backhaul for NR", RP-170148, 3GPP TSG RAN Meeting #75, Dubrovnik, Croatia, Mar. 9, 2017, 8 pages.

Huawei et al., "Consideration on IAB physical layer enhancement", R1-1720606, 3GPP TSG RAN WG1 Meeting #91, Reno, USA, Nov. 18, 2017, 9 pages.

Qualcomm, "Motivation for SID on Integrated Access & Backhaul (IAB) in NR", RP-170176, 3GPP TSG RAN Meeting #75, Dubrovnik, Croatia, Mar. 9, 2017, 16 pages.

International Search Report for PCT/KR2018/015104 dated Mar. 18, 2019, 10 pages.

Written Opinion of the ISA for PCT/KR2018/015104 dated Mar. 18, 2019, 5 pages.

Office Action for IN Application No. 202017026681 dated Mar. 28, 2022, 9 pages.

Office Action for EP Application No. 18883671.2 dated Jul. 29, 2022, 10 pages.

* cited by examiner

[Fig. 1]
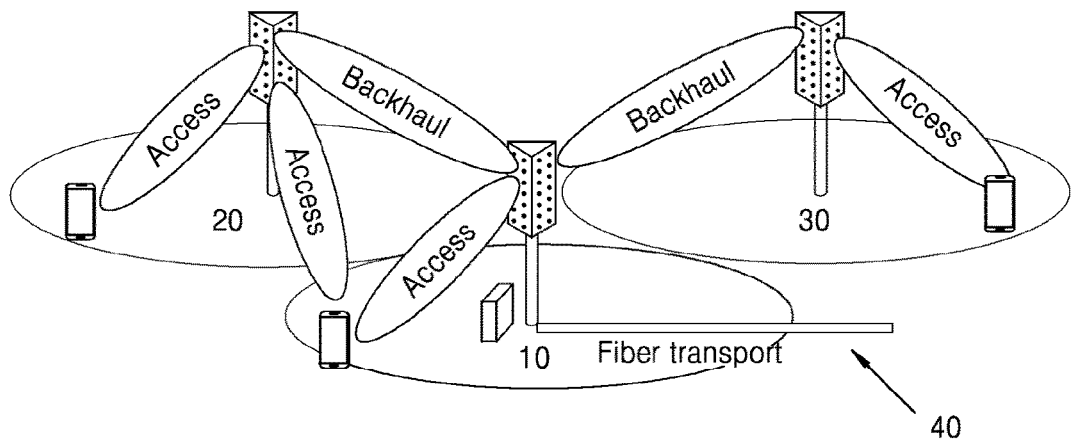
[Fig. 2]
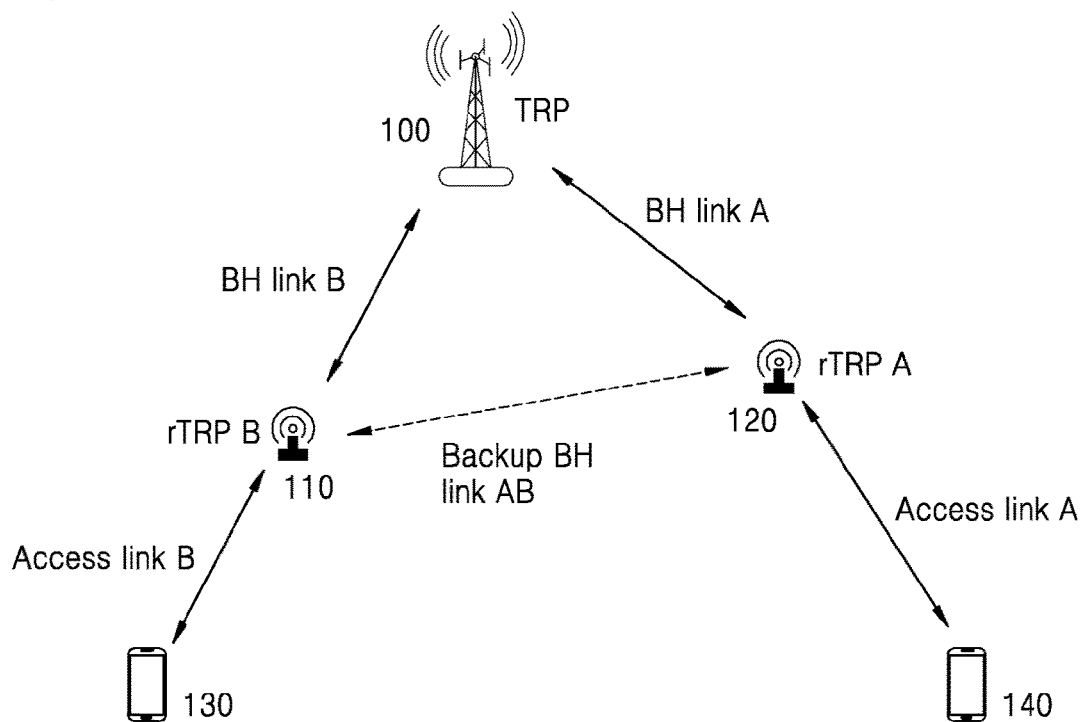
[Fig. 3]
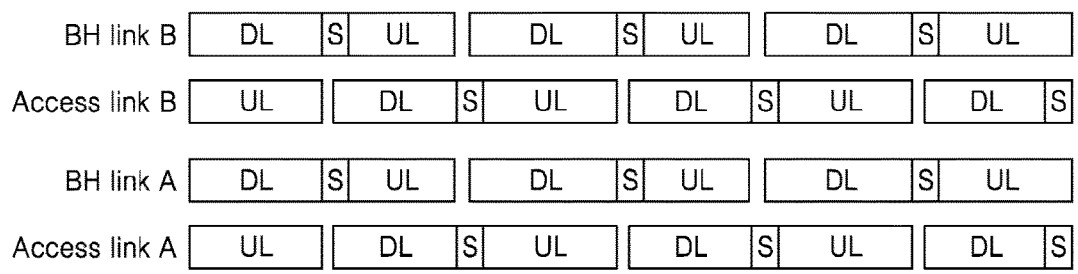
[Fig. 4]
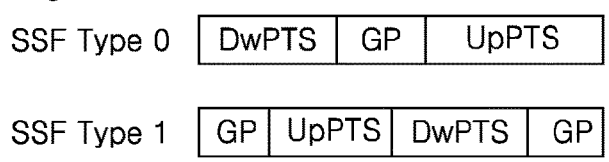

[Fig. 5]
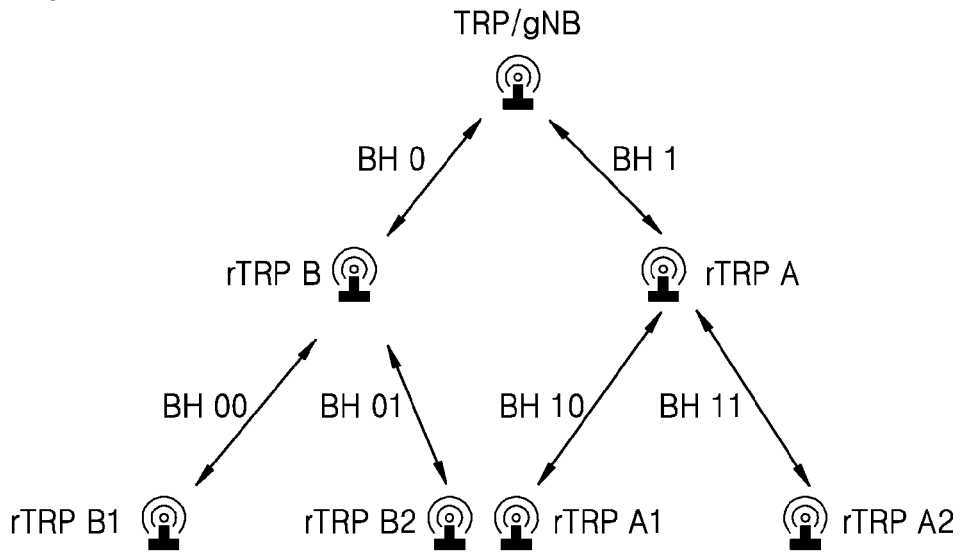
[Fig. 6]
| BH0  | 0 | 0 | 0 | 0 |
|------|---|---|---|---|
| BH1  | 1 | 1 | 1 | 1 |
| BH00 | 0 | 0 | 1 | 1 |
| BH01 | 1 | 1 | 0 | 0 |
| BH10 | 0 | 1 | 0 | 1 |
| BH11 | 1 | 0 | 1 | 0 |
[Fig. 7]
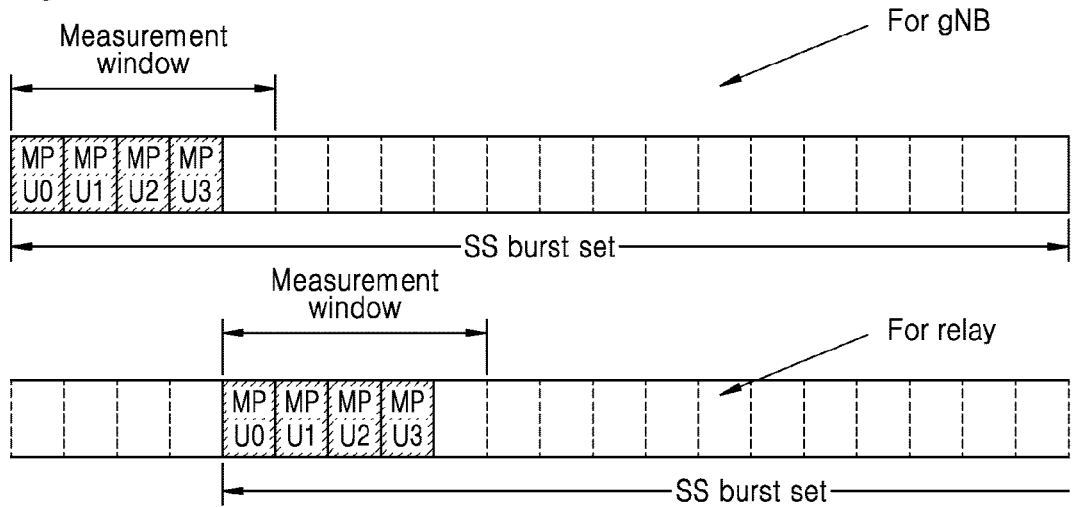

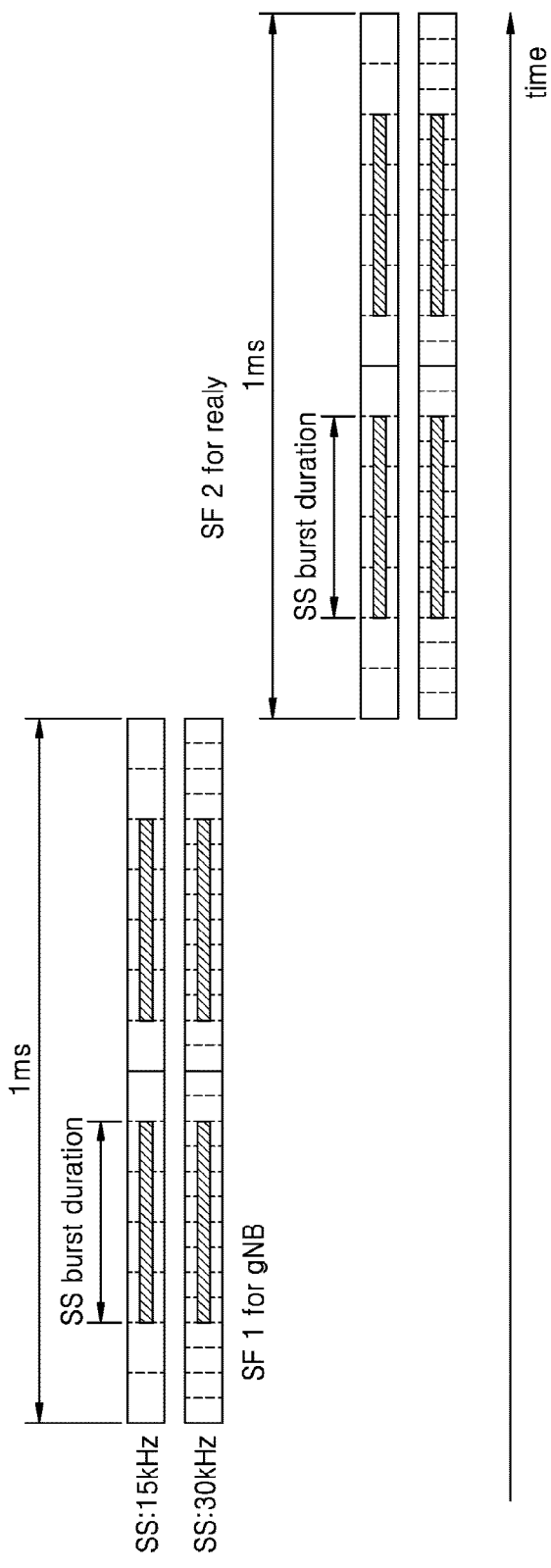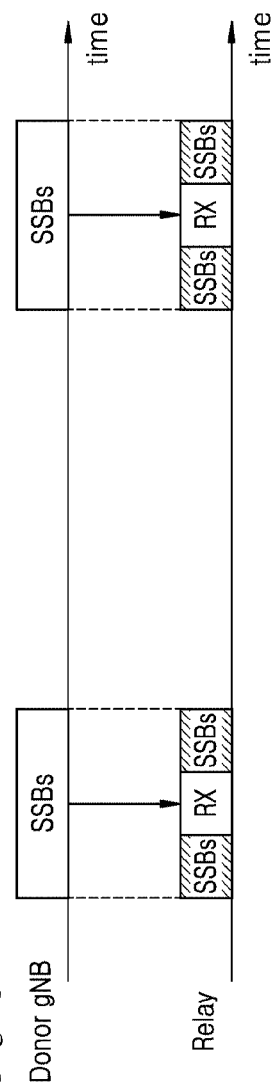

ROUTE DISCOVERY IN A TELECOMMUNICATION NETWORK

This application is the U.S. national phase of International Application No. PCT/KR2018/015104 filed Nov. 30, 2018 which designated the U.S. and claims priority to IN Patent Application No. 201731043105 filed Dec. 1, 2017, and GB Patent Application No. 1819385.4 filed Nov. 28, 2018, the entire contents of each of which are hereby incorporated by reference.

TECHNICAL FIELD

The present invention relates to route discovery in a telecommunication network. It particularly applies to route discovery in a network which uses Integrated Access and Backhaul (IAB). IAB is used or proposed in Fifth Generation (5G) or New radio (NR) systems.

BACKGROUND ART

To meet the increase in demand for wireless data traffic after the commercialization of 4G communication systems, considerable efforts have been made to develop improved 5G communication systems or pre-5G communication systems. This is one reason why '5G communication systems' or 'pre-5G communication systems' are called 'beyond 4G network communication systems' or 'post Long Term Evolution (LTE) systems'. In order to achieve a high data rate, 5G communication systems are being developed to be implemented in a super-high frequency band (millimeter wave (mmWave)), e.g., a band of 60 GHz. In order to reduce path loss in such a super-high frequency band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multipoints (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are used. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using beamforming, MIMO, array antennas, etc. Application of a cloud RAN as the above-described big data processing technology may be an example of convergence of the 5G communication technology and the IoT technology.

As one of various technologies capable of satisfying increasing demands for large-capacity data communication, a method of providing multiple connections has been disclosed. For example, multiple connections may be provided using multiple carriers according to a carrier aggregation (CA) technique for LTE systems. As such, users may use more resources to receive services. In addition, the LTE systems may provide various services including broadcast services such as multimedia broadcast multicast service (MBMS).

SUMMARY

By means of this IAB structure, many base stations can be provided which do not need a physical data connection to the core network and can use a portion of the access spectrum to communicate with a suitably equipped base station.

The amount of spectrum allocated to access or backhaul in a particular setting may be adjustable to meet the requirements at any given time. These requirements can include, for instance, system load, terrain or particular user requirements.

Disclosed is a method of route discovery in connection with establishing a backup backhaul network in an Integrated Access and Backhaul, IAB, network, the method comprising: discovering and maintaining backup backhaul links by providing channel measurement and reporting mechanisms.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1 shows a representation of IAB;
FIG. 2 shows a representation of backup Backhaul links;
FIG. 3 shows a representation of frame structures for 2 links;
FIG. 4 shows a representation of sub-frame (SF) structures
FIG. 5 shows a system model comprising several base stations and backhaul links;
FIG. 6 shows a table showing a configuration of timeslots according to an embodiment of the present invention;
FIG. 7 shows a representation of a measurement window according to an embodiment of the invention;
FIG. 8 shows a representation of synchronisation signal (SS) offset according to an embodiment of the invention; and FIG. 9 shows a representation of muted SSBs according to an embodiment of the invention.

DETAILED DESCRIPTION OF EXAMPLE EMBODIMENTS

According to an aspect of the present invention, there is provided a method of route discovery in connection with establishing a backup backhaul network in an Integrated Access and Backhaul, IAB, network, the method comprising:

discovering and maintaining backup backhaul links by providing channel measurement and reporting mechanisms.

In an embodiment, reference signals used for channel measurement and reporting comprise least one of synchronization signal/synchronization signal block, SSB, CSI-RS/TRS, and PTRS.

In an embodiment, transmission and/or reception of the reference signals can be configured on one or more of a periodic basis, an aperiodic basis or an on-demand basis.

In an embodiment, under half duplex constraints, different IAB nodes are unable to transmit and receive at the same time.

In an embodiment, the configuration of one or more of the reference signals, the measurement and reporting can be dynamic or semi-persistent and signalling via one or more of DCI, MAC CE and RRC can be used for this purpose.

In an embodiment, different sets of reference signals, such as synchronization signal block (SSB), are multiplexed in time domain and transmitted for inter-node discovery purposes between IAB nodes.

In an embodiment, the reference signals are muted such that a muted time slot is available to listen for reference signals from other nodes for inter-node discovery.

In an embodiment, the multiplexed or muted reference signal is configured based on Cell ID.

In an embodiment, the reference signals are configured in FDM mode with other reference signals.

In an embodiment, the reference signals are off-raster SSBs which are FDMed with SSBs for initial access.

In an embodiment, different SS block based RRM measurement timing configurations, STMC, are configured for different IAB nodes and/or UEs in terms of offset and/or duration.

According to another aspect of the present invention, there is provided apparatus to perform the method of the preceding aspect.

Advantageously, by means of an embodiment of the present invention, if the present backhaul link is blocked, then a backup can be provided quickly and easily.

In an embodiment, resources can be redefined for the purpose of establishing backup links.

Embodiments of the present invention provide improvements in backhaul link discovery and management and also provide channel measurement and reporting mechanisms associated with discovery and maintaining backup backhaul links, so that if/when a current link is blocked, transmission can be easily switched to the backup link Although a few preferred embodiments of the present invention have been shown and described, it will be appreciated by those skilled in the art that various changes and modifications might be made without departing from the scope of the invention, as defined in the appended claims.

Mode for the Invention

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

IAB is a scheme whereby part of the access network (which is used to communicate between Base Stations (BS) and User Equipment (UE)) can be used to provide backhaul. This is illustrated in FIG. 1, where three base stations 10, 20 30 operate to provide access to various User Equipment (UE), as indicated by the beams labelled "Access". However, only base station 10 is connected by fibre to the core network (not shown). Base stations 20 and 30 each communicate with the core network via wireless backhaul connections routed via base station 10.

By means of this IAB structure, many base stations can be provided which do not need a physical data connection to the core network and can use a portion of the access spectrum to communicate with a suitably equipped base station.

The amount of spectrum allocated to access or backhaul in a particular setting may be adjustable to meet the requirements at any given time. These requirements can include, for instance, system load, terrain or particular user requirements.

One of the main features of IAB is to provide Radio Access Network (RAN)-based mechanisms to support dynamic route selection to accommodate short-term blocking and transmission of latency-sensitive traffic across backhaul links. This is also relevant to resource allocation (RA) between access and backhaul links under half-duplexing constraints. There are typically three RA modes defined, namely Time Division Multiplexing (TDM), Frequency Division Multiplexing (FDM) and Space Division Multiplexing (SDM). No matter which RA scheme is applied, there is always a potential problem for backhaul link discovery and management, especially for mmWave where the links can be easily blocked in the physical environment.

Embodiments of the present invention aim to address these and other problems in the prior art, whether identified herein or not.

FIG. 2 shows backup backhaul links in a typical configuration. In this example, SDM is referred to but the same principle applies to other forms of RA, namely TDM and FDM. In FIG. 2, rTRP B 110 can receive from or transmit to donor TRP/gNB 100 and UE 130 simultaneously but cannot do both under the half-duplex constraint.

FIG. 3 shows an example of the frame structure for SDM, where S signifies the gap frame between Downlink (DL) and Uplink (UL). Here it is assumed both backhaul links and access links are using mmWave. Since mmWave links are prone to blockage, backup links are preferably needed so that transmission can be switched to these backup links in case of blockage.

For example, if BH link B is blocked, BH link AB can serve as a backup link so that the data can be transmitted from TRP 100 to rTRP A 120 via BH link A, backup BH link AB and then the access link B to the UE 130. Embodiments of the present invention relate, at least in part, to establishing the backup BH link AB.

Assuming half-duplex operation, i.e., the backhaul DL/UL is aligned with the access UL/DL, a problem arises with how to maintain the backup BH link AB shows in FIG. 2 and also how to conduct operations such as initial access, synchronization, random access, and necessary CSI measurement/reporting for the backup BH link AB. For the example configuration shown in FIG. 2, it requires one rTRP (e.g. 110) to transmit and another rTRP (e.g. 120) to receive at the same time. This is not possible using the frame structure shown in FIG. 3.

In one embodiment, existing resources, e.g., subframe (SF) between DL and UL, reserved/unknown resources in NR, SSB can be re-defined for the purpose of establishing backup BH links. It should be noted that the existing resources, e.g., SF between DL and UL, reserved/unknown resources in NR, synchronization signal block (SSB), should be well aligned in timing.

In other words, to establish a backup backhaul link, it is necessary for rTRP A to transmit a reference signal and for rTRP B to receive the reference signal at the same time. In such a case, there is a need to assign a time slot for rTRP A and the same time slot for rTRP B so that the measurement can happen. Timing alignment is important between these two time slots.

There are two ways to insert such reference signals:
1) In TDD mode, it is necessary to have unknown/reserved subframe(s)/symbol(s) between DL and UL as a guard. The reference signal can be inserted in this guard period.
2) Another way is to use synchronization signal block (SSB), which is transmitted periodically. SSBs from all rTRPs can be transmitted at the same time. When one SSB is transmitted from rTRP A, the composition of SSB in rTRP B can be changed so that it can receive the SSB from rTRP A and measure this signal to establish the link between rTRP A and B.

One embodiment provides three options as set out below.
Option 1: periodic—re-define the existing periodic resources and insert necessary RSs or other signals, as set out in e.g. 1) and 2) immediately above.
Option 2: aperiodic—insert additional resources only for the purpose of route discovery and maintenance. This requires the definition and use of a new resource, which is not currently supported in the prior art, rather than re-using a resource as in Option 1 above.
Option 3: on-demand, as requested by rTRP, via r-PDCCH (or MAC-CE or RRC) the rTRP is provided with the configuration and/or timeline to perform the required measurements. Different SS block based RRM measurement timing configuration (SMTC) configurations are needed for different rTRP (for example offset or duration from the main TRP SMTC). For this option, it is possible to use the resources in both option 1, i.e., SSB or unknown resources, or option 2, a newly defined resource. However, the measurement is configured and defined by rTRP when needed.

In order to support the above measurement to establish backup BH links, it is necessary to define two types of resources:
1) Tx type resources (TxTR), e.g., SSB, Downlink Pilot Timeslot (DwPTS) in SF, DL signals in reserved/unknown resources where a node is expected to transmit, and
2) Rx type resources (RxTR), e.g., muted SSB, Uplink Pilot Timeslot (UpPTS), muted symbols/slots in reserved/unknown resources. Note that if RS for node discovery/backup BH link maintenance is inserted in 'unknown' resources, UE/rTRP might need to monitor unknown resources. The monitoring can be dynamically or semi-persistently switched off to save UE power but DCI, MAC CE or RRC signalings are needed for such purpose.

Tx type resources refer to the time slot used to transmit the reference signal, e.g., SSB.

Rx type resources refer to the time slot used to receive such reference signal, e.g., SSB with different composition (e.g. a muted slot is inserted in normal SSB).

Taking SF as an example, we can modify its frame structure as shown in FIG. 4. Here, node A is configured with type 0 SSF and node B with type 1 SSF. SSF is a special subframe in LTE TDD. It consists of DwPTS, GP and UpPTS. Type 0 is the normal case defined in LTE. Type 1 is a new case according to an embodiment of this invention. The intention of defining such a new type of SSF is the same as defining SSB with a new composition as described earlier.

For SSF type 0, it follows the previous structure, as defined in the prior art. For SSF type 1, its structure is modified so that in the first Guard Period (GP), node B can measure the RSs in DwPTS from node A and conduct operations such as synchronization, random access and CSI measurement. Moreover, in the overlapping part of type 1 UpPTS and type 0 GP, node A can also measure the RSs in UpPTS from node B and conduct operations such as synchronization, random access and CSI measurement. The same principles can be applied to other TxTR or RxTR.

In another embodiment, TxTR and RxTR configuration principles are identified.

It is possible to configure TxTR and RxTR for a group of nodes, e.g., a node and its surrounding nodes to guarantee that different nodes are configured with different TxTR or RxTR, which can be done by offset configuration. As an example, assume that one TRP/rTRP can be connected to a maximum of 2 rTRPs and maximum number of hops is 2 as shown in FIG. 5.

As described above, TxTR refers to transmitting a reference signal and RxTR refers to receiving a reference signal. Two adjacent rTRPs need to have different configurations, e.g., one with TxTR and the other with RxTR so that the link between them can be measured. This would not be possible if both were transmitting (or receiving) simultaneously.

Here we assume there are four time slots. In all time slots, rTRP B is configured with TxTR, i.e., rTRP B transmits reference signals in all 4 time slots. On the contrary, rTRP A is configured with RxTR, i.e., rTRP A always receives the reference signals transmitted by rTRP A. This enables the links between A and B to be measured.

For two hop links, it follow the same logic to configure TxTR and RxTR so that all four rTRPs can measure the links between each other Following the principles identified above, it is possible to have the following configurations with either one hop links or two hop links:
One-hop links:
rTRP B with BH0 and rTRP A with BH1
rTRP B with BH0: TxTR-TxTR-TxTR-TxTR
rTRP A with BH1: RxTR-RxTR-RxTR-RxTR (i.e rTRP A and rTRP B are configured in a complementary manner)
Two-hop links:
rTRP B1 with BH00: TxTR-TxTR-RxTR-RxTR
rTRP B2 with BH01: RxTR-RxTR-TxTR-TxTR
rTRP A1 with BH10: TxTR-RxTR-TxTR-RxTR
rTRP A2 with BH11: RxTR-TxTR-RxTR-TxTR For two hop links, it follows the same logic to configure TxTR and RxTR so that all four rTRPs can measure the links between each other Basically, for two rTRPs connected to the same TRP/rTRP, the configuration of TxTR and RxTR is always different and complementary so that measurement is always possible. However, the periodicity might be different. For example, for one hop links, the periodicity is every slot/ subframe/frame depending on timing granularity but for two hop links, the periodicity could be every other slot/subframe/frame depending on timing granularity or even longer. It can be summarized as shown in the table of FIG. 6. Here, the first column refers to the link identified in FIG. 5, and the remaining columns refer to each of the 4 timeslots, with 0 meaning RxTR and 1 meaning TxTR.

The configuration can be performed in a different manner. For example, it can be based on Cell ID or it can be via RRC configuration.

For aperiodic and on-demand approaches, at least one triggering criterion to activate aperiodic and on-demand operation needs to be defined and a potential criterion may be the quality of existing links, e.g., CSI, RSRP. In other words, the backup backhaul can be initiated if the quality of the main link falls below a defined threshold, as measured by some defined reference signal.

In another embodiment, Synchronization signal blocks (SSBs) are used for such purpose. The relay base stations rTRPA or rTRP B provides synch signals via:
- Offset from SS raster, and hence cannot be seen by UE during initial access
- Different SMTC configuration (SMTC_relay) from the TRP. SMTC is SSB-based RRM measurement timing configuration.
- Different cell-ID
- This cell-ID is derived from the cell-Id of the TRP, some cyclic shift/some fixed relationship
- Relay synch only depends on TRS-type signals, no provision for SS blocks
- UE specific configuration of CSI-RS or TRS or PTRS supported and supports fine frequency/time synch The measurement window of the rTRP can be different from that of donor gNB as shown in FIG. 7. The upper part of the figure shows the measurement window for the gNB and the lower part shows the measurement window for the relay base station e.g. rTRP A. This ensures that the relay TRP is able to measure reference signals at a different time to avoid interference between those reference signals.

In another embodiment, SS (synchronization signal) burst set composition can be redesigned from prior art implementations. A fixed offset from gNB SS timing to the relay SS timing may provided as shown in FIG. 8. The intention is for gNB and rTRP to have different times to transmit SSB so that they do not interfere with each other.

In such a case, a maximum of "X" SMTC offsets need to be provided to UE to allow for synch with TRP and rTRPs. X can be 2 or 3 etc. Based on the initial synch to TRP, TRP can identify the neighbors, and allot appropriate SMTC offset for this purpose.

There are two alternatives for automatically finding the rTRP SS signals
1): Different sets of SSB (SS block) indices for TRP and rTRP can be used. TRP uses 1 to N1, rTRP 1 uses N1+1 to N2 and so on until 64. This index allotment is performed by the TRP. These indices can be in the same or different directions i.e., the directions 1 to N1 may overlap with directions covered by N1+1 to N2 indices. Coverage/power level adjustments for SSB can be done by TRP and rTRP to reduce interference based on network deployment
2): Use same set of SSB indices 1 to N1 for all TRP and rTRP, but mute some SSBs where potential interference may occur. Only one of TRP or rTRP has to mute the SSB to reduce interference while still supporting users in that direction as shown in FIG. 9.

In another embodiment, dedicated resources can be used to establish the backup links and any or of all the above mentioned alternatives can also be applied, but the trade-off between the performance and extra resources needs to be considered and a compromise configuration should be selected as required.

In another embodiment, a list of all surrounding rTRPs/TRPs is sent to rTRPs to establish the backup links. An example is the whitelist known in LTE. This list can be included in system information, e.g., SIB and broadcasted by the donor gNB.

Option 1: Layer 3 rTRP with different cell ID from the donor gNB, only cell IDs are needed in the list
Option 2: Layer 2 rTRP with same cell ID as the donor gNB, additional information is needed in the list.

For option 2 above, new IDs, different from cell ID, need to be defined for rTRPs and an example can be offset cell ID.

In another embodiment, the configuration of neighbouring rTRPs, such as SMTC config, re-defined resources configuration, needs to be known to the rTRP so that each other rTRP can use the configuration of its neighbour rTRPs and then perform measurements. Such information can be included in system information, e.g., SIB and broadcasted by the donor gNB.

In another embodiment, various methods to determine thresholds of selected backup BH links are defined. There are multiple potential routes, but sometimes only a subset of all possible routes need to be monitored to save reporting signaling, time and energy. Therefore, a node needs to select a subset of nodes to establish backup links from all potential nodes. It can be determined by upper layer routing and scheduling but it also depends on PHY measurement. Three alternatives are listed as below:

Fixed Threshold

Depends on RSRP of the connected AP, e.g., x % of the RSRP of the connected AP. The rTRP is connected to one TRP/rTRP and it can measure RSRP for this active link (e.g., RSRP value is W). Using one or more of the embodiments described, a rTRP can measure the backup backhaul links which are not active but can be active when the current link is blocked. Based on the measurement, the threshold can be x %*W.

Flexible threshold but with a fixed number of backup links, n backup links from N potential backup links. For example, if n backup links are needed or specified, the rTRP can measure N>n potential links and choose n out of N links.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method of route discovery performed by a first Integrated Access and Backhaul (IAB) node, the method comprising:
    receiving a synchronization signal block (SSB) from a second IAB node;
    performing a measurement based on the received SSB; and
    establishing a backup backhaul link with the second IAB node based on a result of the measurement,
    wherein the SSB is an off-raster SSB.

2. The method of claim 1, wherein transmission and/or reception of the SSB is configured to be periodic, aperiodic, or on-demand.

3. The method of claim 1, wherein, if the first IAB node and the second IAB node are configured for half duplex communication, then the first IAB node and the second IAB node are unable to transmit and receive at a same time.

4. The method of claim 1, wherein a configuration of the SSB is configured dynamically or semi-persistently with at least one of Downlink Control Information (DCI) signaling, Medium Access Control (MAC) signaling, Control Element (CE) signaling, and Radio Resource Control (RRC) signaling.

5. The method of claim 1, wherein the SSB is transmitted and/or received using Time Divisional Multiplexing (TDM).

6. The method of claim 1, wherein the SSB is muted when interference occurs.

7. The method of claim 5, wherein the SSB is configured based on a Cell ID.

8. The method of claim 1, wherein the SSB is transmitted and/or received using Frequency Divisional Multiplexing (FDM).

9. The method of claim 1, wherein the first IAB node is configured with a first SSB based RRM measurement timing configuration (SMTC) and the second IAB node is configured with a second SMTC.

10. A first Integrated Access and Backhaul (IAB) node for performing route discovery, comprising:
    a transceiver, and
    a processor configured to:
        receive a synchronization signal block (SSB) from a second IAB node,
        perform a measurement based on the received SSB, and
        establish a backup backhaul link with the second IAB node based on a result of the measurement,
    wherein the SSB is an off-raster SSB.

11. The IAB node of claim 10, wherein, if the first IAB node and the second IAB node are configured for half duplex communication, then the first IAB node and the second IAB node are unable to transmit and receive at a same time.

12. The IAB node of claim 10, wherein one or more measurements of the SSB are configured for dynamic or semi-persistent reporting with one or more of Downlink Control Information (DCI) signaling, Medium Access Control (MAC) signaling, Control Element (CE) signaling, and Radio Resource Control (RRC) signaling.

13. The IAB node of claim 10, wherein the processor is configured to transmit and/or receive the SSB using Time Divisional Multiplexing (TDM).

14. The IAB node of claim 10, wherein the SSB is muted when interference occurs.

15. The IAB node of claim 13, wherein the SSB is configured based on a Cell ID.

16. The IAB node of claim 10, wherein the processor is configured to transmit and/or receive the SSB is using Frequency Divisional Multiplexing (FDM).

17. The IAB node of claim 10, wherein the first IAB node is configured with a first SSB based measurement RRM timing configuration (SMTC) and the second IAB node is configured with a second SMTC.

* * * * *